Figure 1:
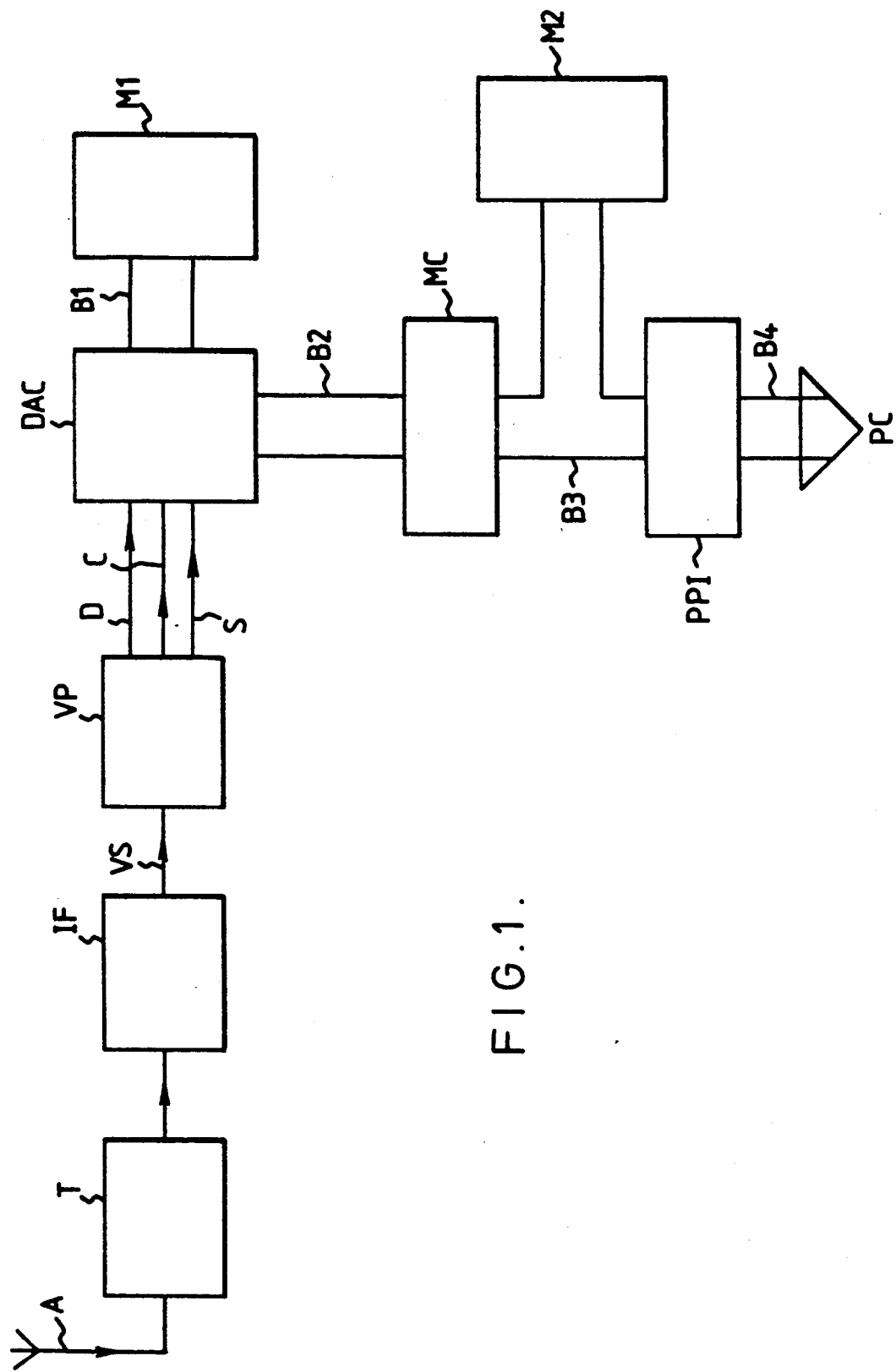

United States Patent [19]

Davies

[11] Patent Number: 5,012,338

[45] Date of Patent: Apr. 30, 1991

[54] TELETEXT DECODERS

[75] Inventor: Andrew K. Davies, Purley, England

[73] Assignee: U.S. Philips Corporation, New York, N.Y.

[21] Appl. No.: 534,775

[22] Filed: Jun. 7, 1990

[30] Foreign Application Priority Data

Jun. 16, 1989 [GB] United Kingdom ............... 8913903

[51] Int. Cl.$^5$ .......................... H04N 7/87; H04N 7/04
[52] U.S. Cl. ...................................... 358/147; 358/142
[58] Field of Search ......................... 358/142, 146, 147

[56] References Cited

U.S. PATENT DOCUMENTS

| | | | |
|---|---|---|---|
| 4,653,055 | 3/1987 | Micic et al. | 371/69.1 |
| 4,679,082 | 7/1987 | Shibasaki | 358/147 |
| 4,701,914 | 10/1987 | Mitsushita | 371/13 |
| 4,719,510 | 1/1988 | Kinghorn | 358/147 |
| 4,910,595 | 3/1990 | Bugg et al. | 358/147 |
| 4,953,022 | 8/1990 | Bugg | 358/147 |
| 4,963,968 | 10/1990 | Bugg et al. | 358/147 |

OTHER PUBLICATIONS

"Computer Controlled Teletext User's Manual" by Kinghorn; Mullard Application Laboratory Mitcham; Nov. 1, 1983.
"Broadcast Teletext Specification" by British Broadcasting Corp., Independent Broadcasting Authority and British Radio Equipment Manufacturers Association, Sep. 1976.

Primary Examiner—John W. Shepperd
Assistant Examiner—Michael D. Parker
Attorney, Agent, or Firm—William Squire

[57] ABSTRACT

A teletext decoder comprises a main memory (M2) which includes a raw data buffer (RDB) in rows RD0 to RDn of which teletext data packets and non-teletext "junk" data packets are stored in the order in which they are received, and a reformatting buffer (RB) to rows R0 to R31 of which the data packets stored in the RDB memory are transferred, the data packets in the RB memory being stored in a given numeral sequence. Each of the rows R0 to R31 of the buffer (RB) has a status buffer (SB) byte B0 to B31 respectively, associated with it for indicating whether the corresponding data packet has been received out of its correct given numerical sequence, and thereby being a possible non-teletext "junk" data packet which may be subsequently overwritten by a valid data packet.

10 Claims, 2 Drawing Sheets

TELETEXT DECODERS

This invention relates to teletext decoders for use in a receiver which is suitable for receiving teletext transmissions of a type in which coded data pulses are transmitted in a television signal in television lines where no picture signals representing normal picture information are present e.g. in the field or vertical blanking interval (VBI).

Of interest is copending application Ser. No. 534,799 filed concurrently herewith entitled "Teletext Decoders" by the instant inventor and assigned to the assignee of the present invention.

The document "Broadcast Teletext Specification", September 1976, published in the U.K. jointly by British Broadcasting Corporation, Independent Broadcasting Authority and British Radio Equipment Manufacturers' Association, discloses a specification for transmitting teletext information in 625-line television systems.

Proposals for enhancing the teletext specification given in the said "Broadcast Teletext Specification" are given in the document "World System Teletext and Data Broadcasting System" December, 1987, compiled by the Department of Trade and Industry of the U.K. Government.

In these documents teletext data is sub-divided into so-called data packets, there being, at the present time, up to 32 different data packets which are conveniently referred to as packets 0 to 31, respectively.

Packets 0 to 23 are display packets and are used to generate a teletext display on the screen of a television or other receiver. The remaining data packets are commonly referred to as extension packets and do not form part of a teletext display page, but provide for certain enhancements of the basic display or provide other services such as the packet 31 commercial data service.

Each data packet is provided with its own unique row or packet address which allows them either to be transmitted in package sequence order or in any order, or row adaptive transmission may be used where only selected ones of the data packets are transmitted. The teletext decoder is able to accurately identify each data packet from its row or packet address.

It has been found, however, that it is possible for non-teletext "junk" data packets to be received which appear to have a row or packet address which is the same as that of one of the valid data packets. These non-teletext "junk" data packets are undesirable as they corrupt the valid data packets, and may appear, for example, as a row of unintelligible graphic signs on the display screen.

It is an object of the present invention to provide a teletext decoder in which the effects of these non-teletext "junk" data packets are reduced.

According to one aspect of the present invention, there is provided a teletext decoder for use in a receiver which is suitable for receiving teletext transmissions of a type in which coded data pulses in the form of teletext data packets are transmitted in a television signal in television lines where no picture signals representing normal picture information are present, the teletext decoder comprising first memory means for storing received data packets in a given numerical sequence order and characterised by means for indicating whether each data packet has been received in the correct given numerical sequence order, further means being provided for overwriting a data packet which is indicated as having been received out of its given numerical sequence order with a data packet having the same packet address which has been received in its correct given numerical sequence order.

In this way, if data packets are being transmitted in numerical sequence order, a data packet which is received out of numerical sequence order is likely to be a non-teletext "junk" data packet and will be overwritten by the correct data packet when that data packet is received.

A preferred form of teletext decoder is characterised by second memory means for storing the received data packets in the order they are received, and further means for transferring the data packets stored in the second memory means to the first memory means.

Preferably, the means for indicating whether each data packet has been received in its correct given numerical order comprises third memory means associated with each of the data packets stored in the first memory means, in which case it may be arranged that the third memory means affords an indication of whether a corresponding data packet has been stored in the first memory, whether that data packet was received in the correct given numerical sequence order, or whether that data packet was received out of its correct given numerical sequence order.

A subsequent packet having an apparent valid packet address which corresponds to that of a packet already stored in its correct given numerical sequence may be rejected.

According to another aspect of the present invention, there is provided a method of processing a received teletext transmission of a type in which coded data pulses in the form of teletext data packets are transmitted in a television signal in television lines where no picture signals representing normal picture information are present, the method comprising the step of storing received data packets in a given numerical sequence order and being characterised by the steps of indicating whether each data packet has been received in the correct given numerical sequence order, and overwriting a data packet which is indicated as having been received out of its given numerical sequence order with a data packet having the same packet address which has been received in its correct given numerical sequence order.

Figure 2:
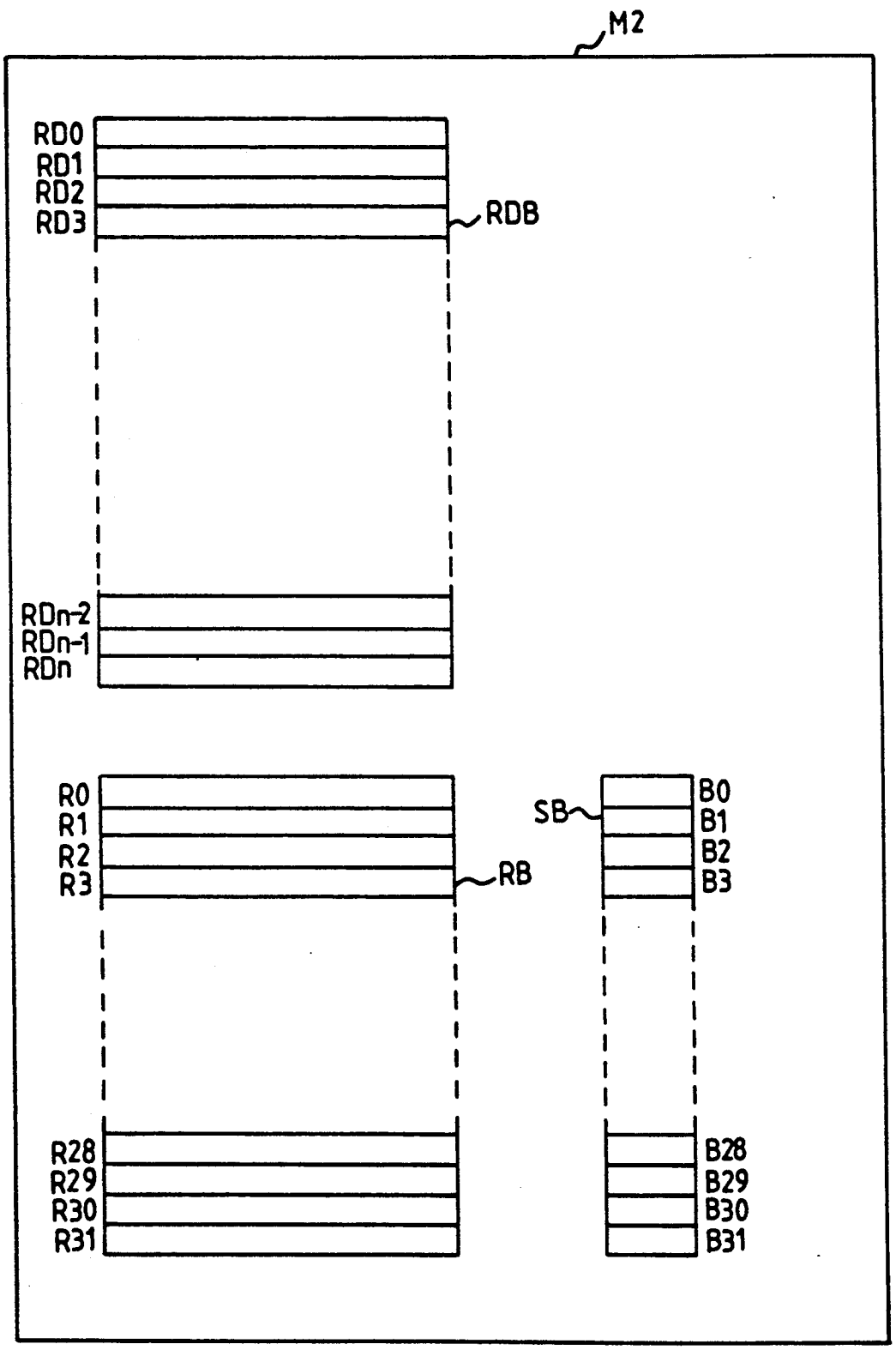

An exemplary embodiment of the invention will now be described reference being made to the accompanying drawings, in which:

FIG. 1 is a block schematic diagram of a teletext decoder in accordance with the present invention; and FIG. 2 shows diagrammatically parts of the memory M2 of FIG. 1 in greater detail.

In FIG. 1 of the drawings there is shown a block schematic diagram of a teletext decoder which comprises an antenna A for receiving a teletext transmission, the antenna A being connected to a television tuner T (typically a Philips Components tuner unit type U744) which affords an output to an intermediate frequency stage IF (typically a Philips Components integrated circuit type TDA 2541). The demodulated video signal VS from the intermediate frequency stage IF is applied to a video processing circuit VP (typically a Philips Components integrated circuit type SAA 5231) which performs, among other things, data slicing for retrieving serial teletext data pulses D from the video signal VS. The video processor VP also produces data clock pulses C and line sync pulses S from the video signal VS. The data pulses D together with the clock pulses C and line sync pulses S are fed to a data acquisition and control circuit DAC, which is preferably a Philips Components integrated circuit type SAA 5250. The data acquisition and control circuit DAC operates on the serial teletext data pulses from the video processor VP and converts them into parallel data bytes which are stored in a dedicated first-in, first-out random access memory (typically of 2K×8 bit) M1, via a multi-bit address and data bus B1.

The data acquisition and control circuit DAC is operated under the control of a microcontroller MC (typically an Intel type 8031) via a multi-bit address and data bus B2 which is itself interconnected with a programmable peripheral interface PPI (typically an Intel type 8255) and a main (random access) memory (typically a 32K×8 bit) M2 via a further multi-bit address and data bus B3. Buses B2 and B3 can be common. The programmable peripheral interface PPI affords access to a compatible personal computer PC (typically an IBM PC) via a multi-bit address and data bus B4, the computer PC controlling the display of the received teletext data.

In the teletext decoder of FIG. 1, the data bytes corresponding to the received teletext information are output from the data acquisition and control circuit DAC and stored in the memory M1. Once every vertical blanking interval (VBI) period the contents of the memory M1 are transferred, under the control of the microcontroller MC, to the main memory M2.

In FIG. 2 of the drawings, the memory M2 of the teletext decoder of FIG. 1 is shown diagrammatically in greater detail.

A portion of the main memory M2 is used as a raw data buffer (RDB) which typically consists of 100 to 200 rows, numbered RD0 to RDn, each of 42 bytes, each row of which has two bytes assigned to the magazine and row addresses whilst the remaining bits are arranged to store all the bytes relating to a particular data packet, it being recalled that there are typically up to 32 different data packets, each of which is numbered from 0 to 31.

The data packets of the received teletext data are stored in the buffer RDB in the order that they are received as raw data.

In order to assist in an understanding of the invention it will initially be assumed that the teletext data packets have been transmitted in a strictly progressive numerical sequence order i.e. packet 0 followed by packet 1 followed by packet 2, etc. though it will be appreciated that packets 29 to 31 may not directly contribute to the transmitted page in which they appear. Provided all data packets have been transmitted then data packets 0 to 31 will be stored sequentially in rows of the raw data buffer RDB. If it assumed this buffer is initially completely empty these could be rows RD0 to RD31. However, because it is possible to receive non-teletext "junk" data packets which appear to present the same address as valid data packets, it may be found, for example, that a non-teletext "junk" data packet 6 was received immediately after a valid data packet 1 and this would be stored in row RD2 of the buffer RDB, the valid data packet 1 having been stored in row RD1 thereof.

If no action is taken, the non-teletext "junk" data packet 6 will corrupt the data stored in the buffer RDB which is very undesirable.

In order to overcome the problem of non-teletext "junk" data packets, the data packets stored in the buffer RDB are transferred to a reformatting buffer (RB) which also forms part of the main memory M2. The buffer RB consists of 32 rows, numbered R0 to R31, each of 40 bytes, into which the data packets stored in the buffer RDB are transferred.

However, the data packets in the buffer RB are stored in correct numerical sequence, regardless of the order a particular data packet was received in. Thus, data packet 0 is always stored in row R0, data packet 1 is stored in row R1 . . . data packet 31 is stored in row R31, of the RB memory.

Thus, in the example considered above in which a non-teletext "junk" data packet 6 was received after a valid data packet 1, whereas in the buffer RDB the valid data packet 1 was stored in row RD1 and the non-teletext "junk" data packet 6 was stored in row RD2, in the buffer RB, the valid data packet 1 will be stored in row R1 and the non-teletext "junk" data packet 6 will be stored in row R6.

Associated with the buffer RB is a status buffer SB, which typically consists of 32 bytes (each of 8-bits) B0 to B31, each byte of which corresponds to a respective row of the buffer RB. The buffer SB bytes B0 to B31 are used to indicate the status of the data packet which is stored in the corresponding row of the buffer RB.

For example, at the beginning of a routine, all the memory bytes will be set to zero to indicate that no relevant data packets are stored in the buffer RB. When a data packet is received in the correct numerical sequence, the corresponding buffer SB byte is set to "1". When a data packet is received out of the correct numerical sequence, the corresponding buffer SB byte is set to "2".

Thus, in the example considered above, the valid data packet 1 will be stored in row R1 of the buffer RB and the corresponding buffer SB byte B1 will be set to "1" to indicate that it had been received in sequence. The non-teletext "junk" data packet 6 will be stored in row R6 of the buffer RB, but the corresponding buffer SB byte B6 will be set to "2" to indicate that it had been received out of sequence (and might therefore be a non-teletext "junk" data packet). When subsequent data packets are received, the status of the corresponding buffer SB byte is read-out and if it had been set to "2" (indicative of an out of sequence data packet) then if the subsequent data packet had been received in sequence, it is caused to overwrite the data packet stored in the respective row of the buffer RB. Thus, if a data packet 6 is subsequently received in its correct numerical sequence, i.e. after data packet 5, it is written into row R6 of the buffer RB in place of the original, out of sequence, data packet. After the correct packet has replaced a non-teletext "junk" packet the status byte will return to "1".

In this way, non-teletext "junk" data packets are periodically replaced by correspondingly numbered valid data packets, so alleviating the problem of non-teletext "junk" packets. However if a packet is received in its correct numerical sequence and stored in its correct position in the buffer RB, the subsequent reception of a non-teletext "junk" packet appearing to present the same address is ignored as the status "1" in buffer SB for that packet address shows that a valid packet has already been received.

The aforedescribed arrangement was based on the assumption that the teletext data packets were transmitted in the correct numerical sequence. If this is not the case and the data packets are transmitted out of strict numerical sequence, or row adaptive transmission is used, the buffer SB has no affect save to warn of possible non-teletext "junk" packets.

In some instances it may be required that certain packets are transmitted out of a strictly progressive numerical sequence and can be processed in the order they are transmitted. As an example extension packets 26, 27 and 28 may be transmitted immediately after packet 0 and prior to sequential packets 1 to 23. In such a case the required storage order in buffer RB can be that of transmission so that the buffer contains in sequence R0, R26, R27, R28, R1, R2, R3, etc.

Although described in connection with the specific form of teletext decoder described with reference to FIG. 1 of the drawings, it should be appreciated that the principle of providing a reformatting buffer memory and an associated status buffer memory could be used in other forms of teletext decoder.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or note it mitigates any or all of the same technical problems as does the present invention.

What is claimed is:

1. A teletext decoder for use in a receiver which is suitable for receiving teletext transmissions of a type in which coded data pulses in the form of teletext data packets are transmitted in a television signal in television lines where no picture signals representing normal picture information are present, said teletext decoder comprising first memory means for storing received data packets in a given numerical sequence order and characterised by means for indicating whether each data packet has been received in the correct given numerical sequence order, further means being provided for overwriting a data packet which is indicated as having been received out of its given numerical sequence order with a data packet having the same packet address which has been received in its correct given numerical sequence order.

2. A teletext decoder as claimed in claim 1, characterised by second memory means for storing the received data packets in the order they are received, and further means for transferring the data packets stored in said second memory means to said first memory means.

3. A teletext decoder as claimed in claim 1 characterised in that the means for indicating whether each data packet has been received in its correct given numerical order comprises third memory means associated with each of the data packets stored in said first memory means.

4. A teletext decoder as claimed in claim 3, characterised in that said third memory means affords an indication of whether a corresponding data packet has been stored in said first memory means, whether that data packet was received in the correct given numerical sequence order, or whether that data packet was received out of its correct given numerical sequence order.

5. A teletext decoder as claimed in claim 1, characterised in that a subsequent packet having an apparent valid packet address which corresponds to that of a packet already stored in its correct given numerical sequence is rejected.

6. A method of processing a received teletext transmission of a type in which coded data pulses in the form of teletext data packets are transmitted in a television signal in television lines where no picture signals representing normal picture information are present, said method comprising the step of storing received data packets in a given numerical sequence order and being characterised by the steps of indicating whether each data packet has been received in the correct given numerical sequence order, and overwriting a data packet which is indicated as having been received out of its given numerical sequence order with a data packet having the same packet address which has been received in its correct given numerical sequence order.

7. A teletext decoder as claimed in claim 2, characterized in that the means for indicating whether each data packet has been received in its correct given numerical order comprises third memory means associated with each of the data packets stored in said first memory means.

8. A teletext decoder as claimed in claim 2, characterized in that a subsequent packet having an apparent valid packet address which corresponds to that of a packet already stored in its correct given numerical sequence is rejected.

9. A teletext decoder as claimed in claim 3, characterized in that a subsequent packet having an apparent valid packet address which corresponds to that of a packet already stored in its correct given numerical sequence is rejected.

10. A teletext decoder as claimed in claim 4, characterized in that a subsequent packet having an apparent valid packet address which corresponds to that of a packet already stored in its correct given numerical sequence is rejected.

* * * * *